(12) United States Patent
Marshak et al.

(10) Patent No.: US 9,235,516 B1
(45) Date of Patent: Jan. 12, 2016

(54) TECHNIQUES USING CACHELESS READ AND DEFERRED CACHING

(71) Applicant: EMC Corporation, Hopkinton, MA (US)

(72) Inventors: Marik Marshak, Newton, MA (US); Dan Aharoni, Brookline, MA (US); Stephen Richard Ives, West Boylston, MA (US); Amnon Naamad, Brookline, MA (US); Peng Yin, Southborough, MA (US); Ningdong Li, Acton, MA (US); Sanjay Narahari, Hopkinton, MA (US); Manickavasasaham M. Senghuden, Bangalore (IN); Jeffrey Wilson, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 279 days.

(21) Appl. No.: 13/875,490

(22) Filed: May 2, 2013

(51) Int. Cl.
*G06F 12/08* (2006.01)

(52) U.S. Cl.
CPC ........ *G06F 12/0802* (2013.01); *G06F 12/0888* (2013.01)

(58) Field of Classification Search
None
See application file for complete search history.

(56) References Cited

U.S. PATENT DOCUMENTS

| 5,727,232 | A * | 3/1998 | Iida et al. | 710/56 |
| 2004/0239680 | A1 * | 12/2004 | Emberling | 345/557 |
| 2014/0082249 | A1 * | 3/2014 | Pan et al. | 710/308 |

OTHER PUBLICATIONS

"EMC XtremSW Cache, Server flash caching software for superior performance, intelligence, and protection of mission-critical data," www.emc.com, Data Sheet, Feb. 2013, 3 Pages.
"EMC VFCache, Server Flash cache for superior performance, intelligence, and protection of mission-critical data," www.emc.com, Data Sheet, May 2012, 3 Pages.

* cited by examiner

*Primary Examiner* — Aimee Li
*Assistant Examiner* — Dustin Bone
(74) *Attorney, Agent, or Firm* — Muirhead and Saturnelli, LLC

(57) ABSTRACT

Described are techniques for processing data operations. A read request for first data is received at a data storage system. It is determined whether the read request results in a cache hit whereby the first data is stored in a cache of the data storage system, or whether the read request otherwise results in a cache miss. If the read request results in a cache miss, processing is performed to determine determining whether to perform cacheless read processing or deferred caching processing to service the read request. Determining whether to perform cacheless read processing or deferred caching processing is performed in accordance with criteria including a measurement indicating a level of busyness of a back-end component used to retrieve from physical storage any portion of the first data not currently stored in the cache.

19 Claims, 11 Drawing Sheets

TECHNIQUES USING CACHELESS READ AND DEFERRED CACHING

BACKGROUND

1. Technical Field

This application generally relates to caching, and more particularly to techniques used for caching in connection with servicing read misses.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O operations in connection with data requests, such as data read and write operations.

Host systems may store and retrieve data using a data storage system containing a plurality of host interface units, disk drives, and disk interface units. Such data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical units, logical devices or logical volumes. The logical units may or may not correspond to the actual physical disk drives. Allowing multiple host systems to access the single storage device unit allows the host systems to share data stored therein.

An application may execute on a host where the application performs I/O (input/output) operations issued to the data storage system. In servicing a request, such as a request to read data, the data storage system may utilizing caching. For servicing a read operation, the data storage system may first try to service the read request using data stored in cache. If the requested read data is all in cache, the read may be characterized as a read hit. Otherwise, if the requested read data is not all located in cache, the read may be characterized as a read miss whereby the data storage system may retrieve any portions of the requested data which are currently not stored in cache from physical storage device(s), store the retrieved data in cache, and then return the requested read data to the host. Data which is retrieved from physical storage may be stored in cache for servicing possible future read requests for the same data. In this manner, a first read request that is a read miss results in requested read data being stored in cache whereby a second subsequent read for the same read data now stored in cache results in a cache hit. Such caching techniques are utilized with a goal of increasing performance of the data storage system.

SUMMARY OF THE INVENTION

In accordance with one aspect of the invention is a method of processing data operations comprising: receiving, from a requester, a read request for first data at a data storage system; determining whether the read request results in a cache hit whereby the first data is stored in a cache of the data storage system, or whether the read request otherwise results in a cache miss; if the read request results in a cache miss, determining whether to perform cacheless read processing or deferred caching processing to service the read request, wherein said determining whether to perform cacheless read processing or deferred caching processing is performed in accordance with criteria including a measurement indicating a level of busyness of a back-end component used to retrieve from physical storage any portion of the first data not currently stored in the cache. The cacheless read processing may further include retrieving, using the back-end component that stores and retrieves data from physical storage devices, any portion of the first data not currently stored in the cache from one or more physical storage devices; returning the any portion of the first data directly from the back-end component to a front-end component without caching the first data; and returning the first data from the front-end component to the requester. The deferred caching processing may further include retrieving, using the back-end component, any portion of the first data not currently stored in the cache from one or more physical storage devices; returning the any portion of the first data directly from the back-end component to a front-end component; and asynchronously copying the any portion of the first data retrieved from the one or more physical storage devices by the back-end component to the cache. The back-end component may retrieve the any portion of the first data not currently stored in the cache from the one or more physical storage devices and may store the any portion to a first local buffer of the back-end component and may transmit the any portion of the first data from the first local buffer of the back-end component to a second local buffer of the front-end component. Asynchronously copying any portion of the first data retrieved from the one or more physical devices may be performed as a background copying operation. The measurement may identify a level of utilization of the back-end component. The criteria may specify that a percentage of read requests resulting in a cache miss are processed using the cacheless read processing and that a remaining percentage of read requests resulting in a cache miss are processed using the deferred caching processing. The level of busyness of the back-end component may be determined at each occurrence of a first time interval. An evaluation period may span a second time interval including a plurality of occurrences of the first time interval, and at each occurrence of the second time interval, evaluation processing may be performed including: determining an average level of busyness of the back-end component; and determining a busy level trend for the back-end component. The back-end component may transition from a non-adjusting state to an adjusting state when the average level of busyness for the back-end component exceeds, or is equal to, a maximum level and wherein, once the back-end component is in the adjusting state, the back-end component may transition out of the adjusting state to the non-adjusting state when the criteria specifies that the percentage of read requests resulting in a cache miss that are processed using the cacheless read is zero percent whereby all read requests processed by the back-end component resulting in a cache miss are processed using the deferred caching processing. When the back-end component is in the adjusting state at the end of an evaluation period, adjustment processing may performed. The adjustment processing may include determining whether the average level of busyness of the back-end component is greater than or equal to the maximum level; and if it is determined that the average level of busyness of the back-end component is greater than or equal to the maximum level, increasing a current value denoting the percentage of read requests serviced by the back-end component resulting in a cache miss that are processed using the cacheless read processing. The adjustment processing may further comprise determining whether the average level of busyness of the back-end component is greater than a target level of busyness and also whether the busy level trend indicates that the back-end component has an increasing level of busyness trend; and if it is determined that the average level of busyness of the back-end component is greater than the target level and that the busy level trend indicates that the back-end component has an increasing level of busyness trend, increasing the current value denoting the percentage of read requests serviced by the back-end component resulting in a cache miss that are processed using the cacheless read processing. When the back-end component is in the adjusting state at the end of an evaluation period, adjustment processing may be performed. The adjustment processing may include determining whether the average level of busyness of the back-end component is less than or equal to the minimum level; and if it is determined that the average level of busyness of the back-end component is less than or equal to the minimum level, decreasing a current value denoting the percentage of read requests serviced by the back-end component resulting in a cache miss that are processed using the cacheless read processing. The adjustment processing may also include determining whether the average level of busyness of the back-end component is less than a target level and also whether the busy level trend indicates that the back-end component has a decreasing level of busyness trend; and if it is determined that the average level of busyness of the back-end component is less than the target level and that the busy level trend indicates that the back-end component has a decreasing level of busyness trend, decreasing the current value denoting the percentage of read requests serviced by the back-end component resulting in a cache miss that are processed using the cacheless read processing. The busy level trend, Tb, for the back-end component may be determined as:

$$Tb = \Sigma_{i=1}^{N}(B_i - B_{i-1})*i$$

wherein each Bi i, ranging from 1 to N inclusively, denotes a level of busyness for the back-end component at an $i^{th}$ occurrence of a first time interval, wherein each $B_{i-1}$ denotes a level of busyness for the back-end component at an $i-1^{th}$ occurrence of a first time interval, wherein wherein there are N+1 most recently determined levels of busyness for N+1 most recent occurrences of the first time interval, and whereby, of the N+1 most recent levels of busyness determined for the back-end component, $B_N$, represents a most recently determined level of busyness for the back-end component and $B_0$ represents a least recently determined level of busyness for the back-end component. The target level may be specified as a midpoint between the maximum level and a minimum level of busyness for the back-end component.

In accordance with another aspect of the invention is a system comprising: a plurality of physical storage devices; a plurality of back-end components used to read data from, and write data to, the physical storage devices, wherein each of the plurality of back-end components performs data access operations with respect to a portion of the physical storage devices; a plurality of front-end components which receive I/O requests; a cache; a computer readable medium comprising code stored thereon for: determining whether a read request for first data results in a cache hit whereby the first data is stored in the cache of the data storage system, or whether the read request otherwise results in a cache miss; and if the read request results in a cache miss, determining whether to perform cacheless read processing or deferred caching processing to service the read request, wherein determining whether to perform cacheless read processing or deferred caching processing is performed in accordance with criteria including a measurement indicating a level of busyness of a first of the plurality of back-end components used to retrieve from one or more of the physical storage devices any portion of the first data not currently stored in the cache. The system may also include a plurality of hosts wherein the plurality of hosts send the I/O requests. The cacheless read processing may further include retrieving, using the first back-end component that stores and retrieves data from physical storage devices, any portion of the first data not currently stored in the cache from one or more physical storage devices; returning the any portion of the first data directly from the first back-end component to one of the plurality of front-end components without caching the first data; and returning the first data from the one front-end component to the requester; and wherein the deferred caching processing further includes: retrieving, using the first back-end component, any portion of the first data not currently stored in the cache from one or more physical storage devices; returning the any portion of the first data directly from the first back-end component to the one front-end component; and asynchronously copying the any portion of the first data retrieved from the one or more physical storage devices by the first back-end component to the cache.

In accordance with another aspect of the invention is a computer readable medium comprising code stored thereon that processes data operations, the computer readable medium comprising code for: receiving, from a requester, a read request for first data at a data storage system; determining whether the read request results in a cache hit whereby the first data is stored in a cache of the data storage system, or whether the read request otherwise results in a cache miss; if the read request results in a cache miss, determining whether to perform cacheless read processing or deferred caching processing to service the read request, wherein said determining whether to perform cacheless read processing or deferred caching processing is performed in accordance with criteria including a measurement indicating a level of busyness of a back-end component used to retrieve from physical storage any portion of the first data not currently stored in the cache.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
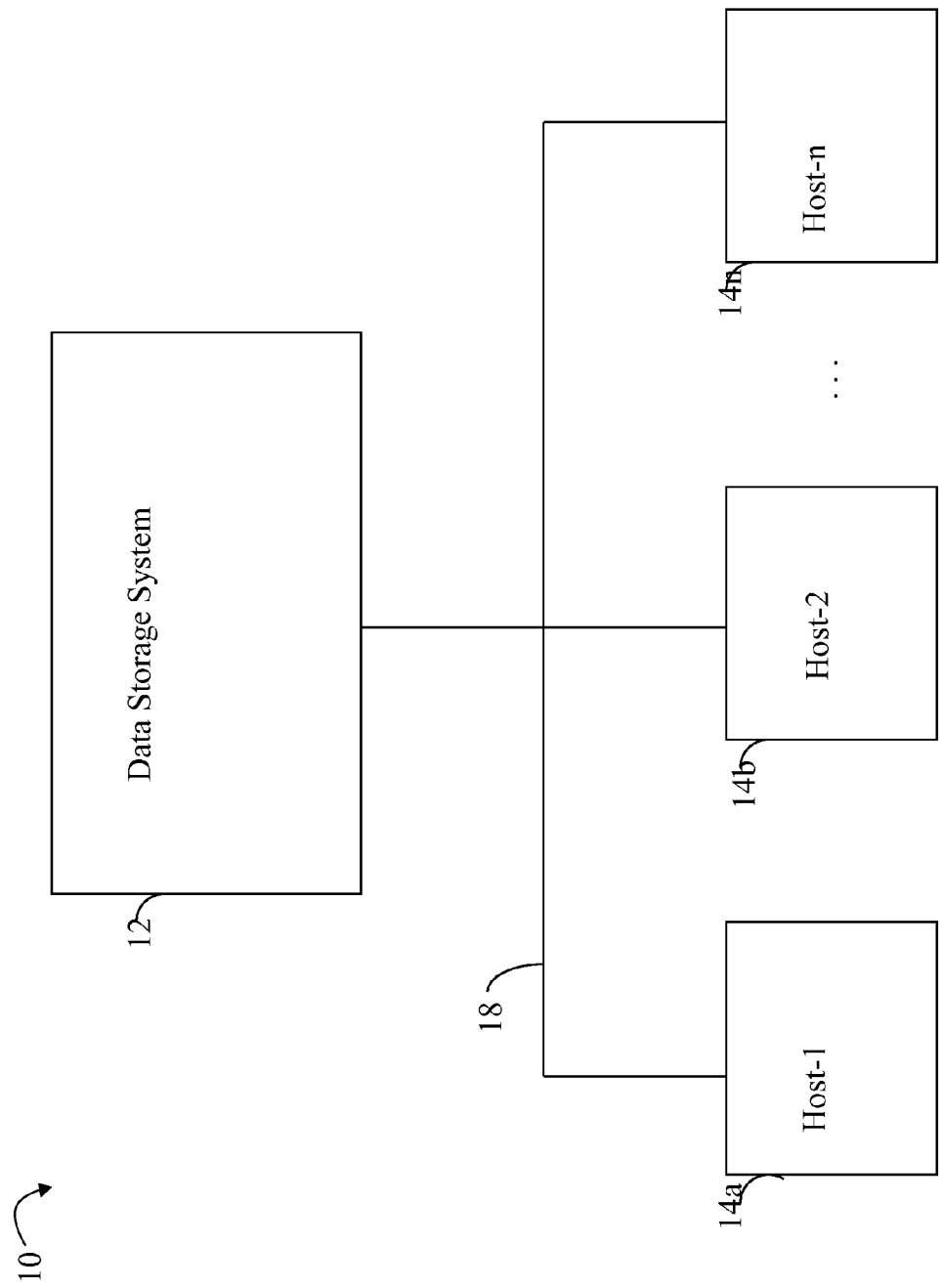
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
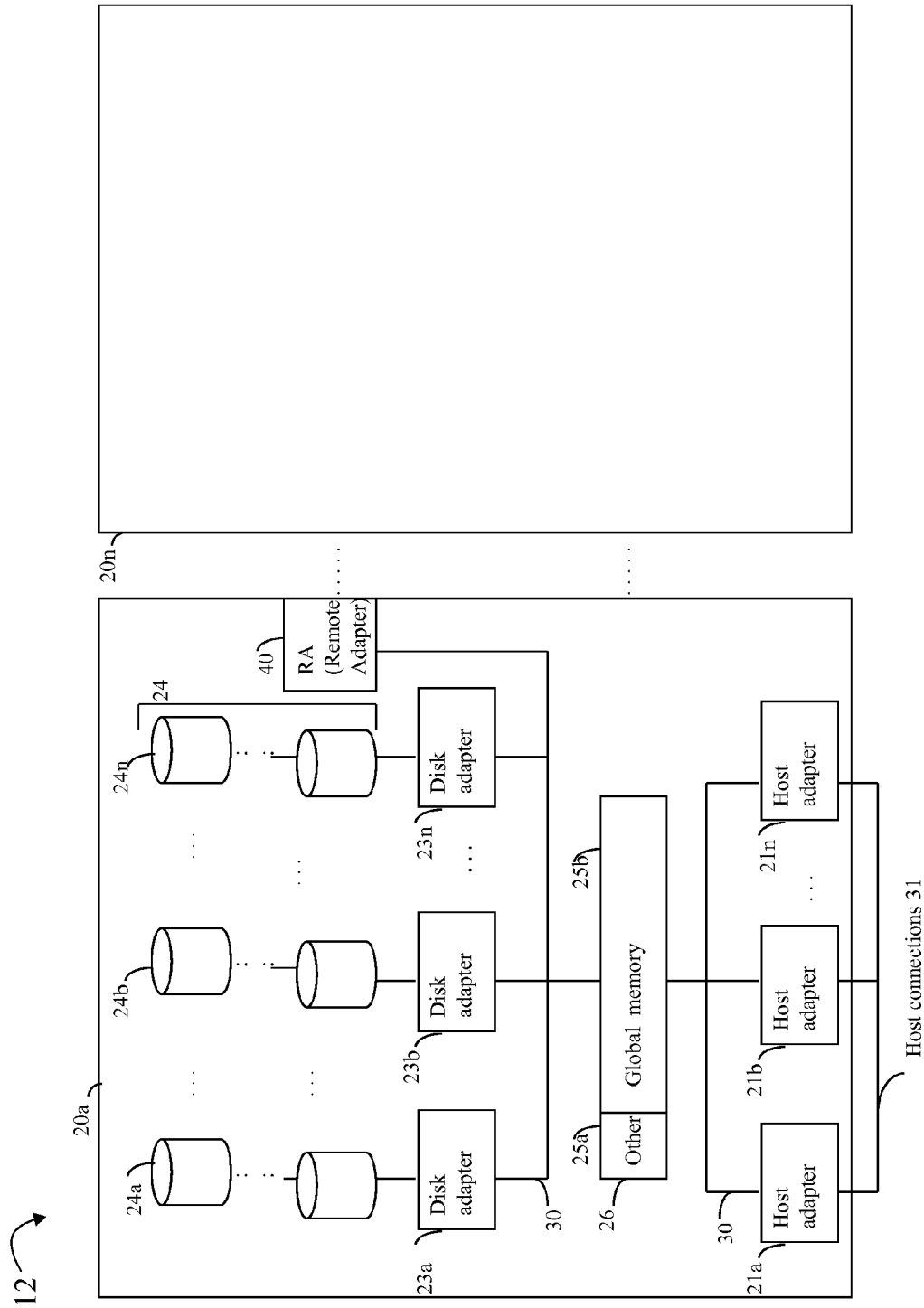
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n. In this arrangement, each of the n groupings of disks may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA performs I/O operations on a disk drive. Data residing on a disk drive may be accessed by the DA following a data request in connection with I/O operations that other directors originate.

It should also be noted that a DA may also be a controller providing access to external physical drives or storage devices located on one or more external data storage systems rather than local physical drives located in the same storage system as the DA (such as illustrated in FIG. 2A). In this manner, the DA may be used in connection with providing a backend virtualization of remote or external devices. For example, the DA included in a first data storage system may be used to provide virtual storage devices of the first data storage system. The virtualized devices may actually be external to the first data storage system and the virtualized devices appear to be local devices of the first data storage system. For example, a first storage array may include one or more local storage devices therein and a DA. The DA may be connected, such as through a network, switch or other connection, to one or more other storage devices which are external with respect to the first storage array. The one or more other external storage devices may be virtualized using the DA and appear to a host or other component of the first storage array to be local devices of the first storage array. As an example, the one or more other external storage devices may be included in a second storage array and the DA of the first array may communicate with an HA of the second storage array over a network connection, such as a SAN, to provide for such virtualization so that the external storage devices appear to be included in, or local to (e.g., directly attached to), the first storage array. The external storage device may be bound or mapped to a local device name of the first storage array through the DA so that there is no distinction in referencing a first storage device which is actually included in the first storage system (e.g., local to the first storage system) and a second virtualized device of the first storage array which is an external storage device appearing as a virtualized device of the first storage array. In this manner, the DA may read data from, and write data to, storage devices which are local to the same physical data storage system as the DA. Additionally, the DA may read data from, and write data to, external storage devices which are not included in the same storage system as the DA (e.g., such external storage devices may be located in a separate physical data storage system different from the physical data storage system including the DA). In such an embodiment where the DA and its local devices are included in a first data storage system, the external storage devices accessed using the DA may be located in a second data storage system and may appear as local devices of the first data storage system.

Figure 2B:
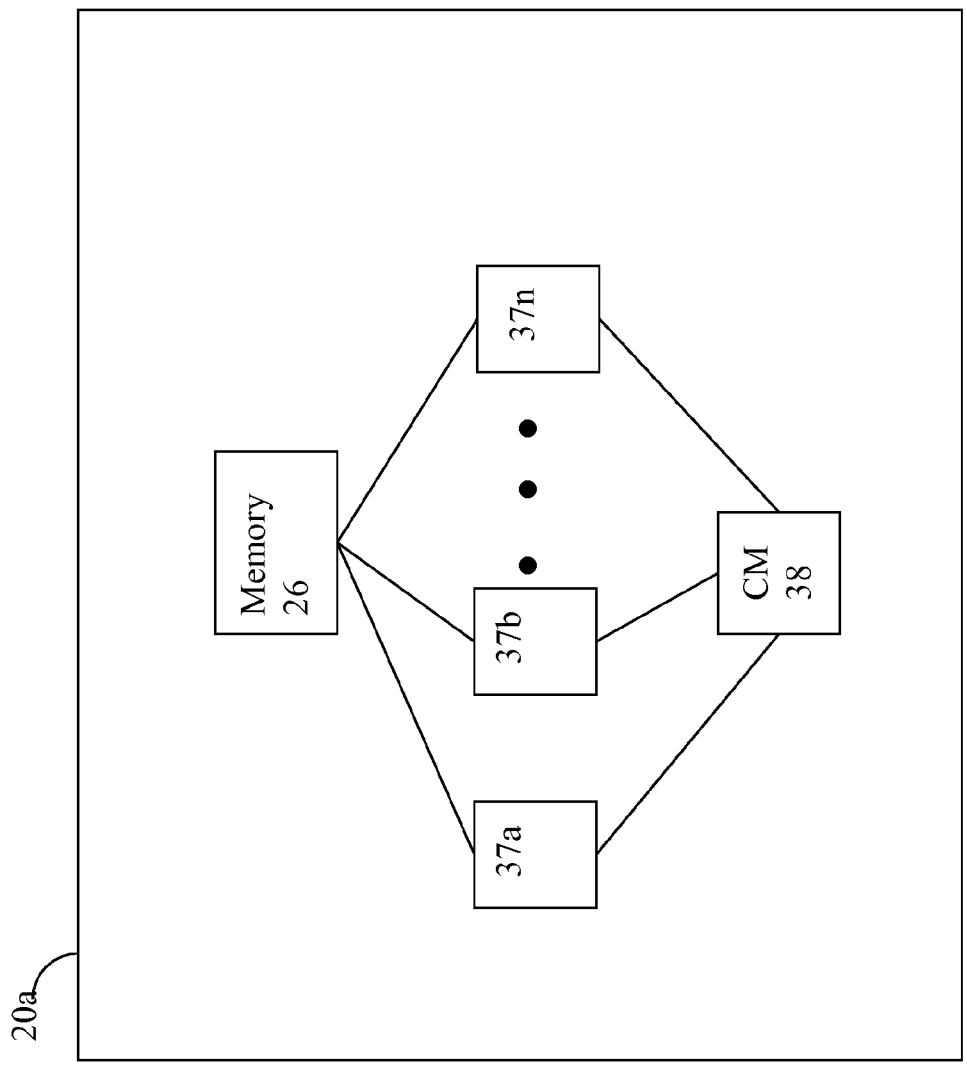
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

Figure 3:
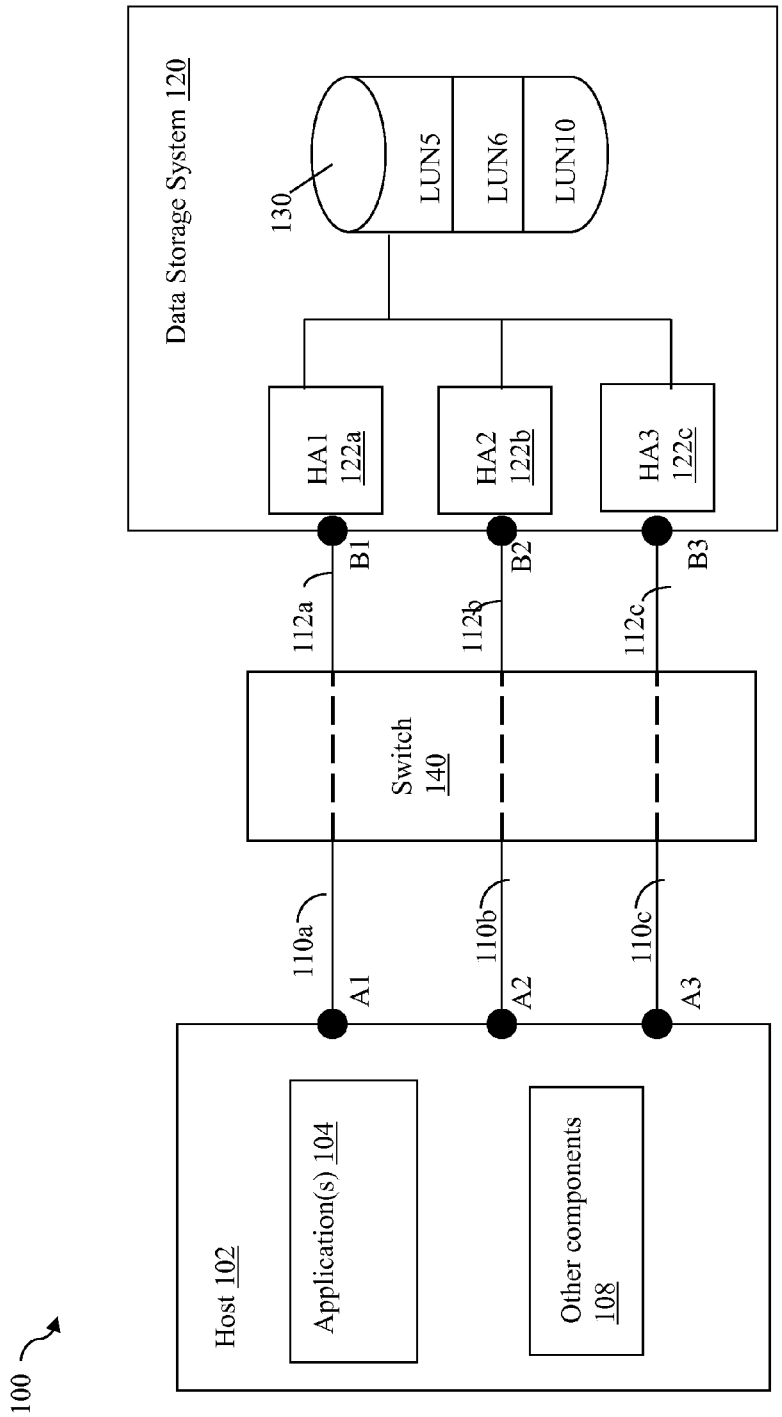
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs-LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

The host 102 may include one or more applications 104 and other components 108 whereby element 108 may include, for example, one or more other device drivers and other code. An I/O operation from the application 104 may be communicated to the data storage system 120 using one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over one or more physical paths. As such, each of the I/O operations may be forwarded from the application 104 to the data storage system 120 over one of the possible multiple paths.

The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
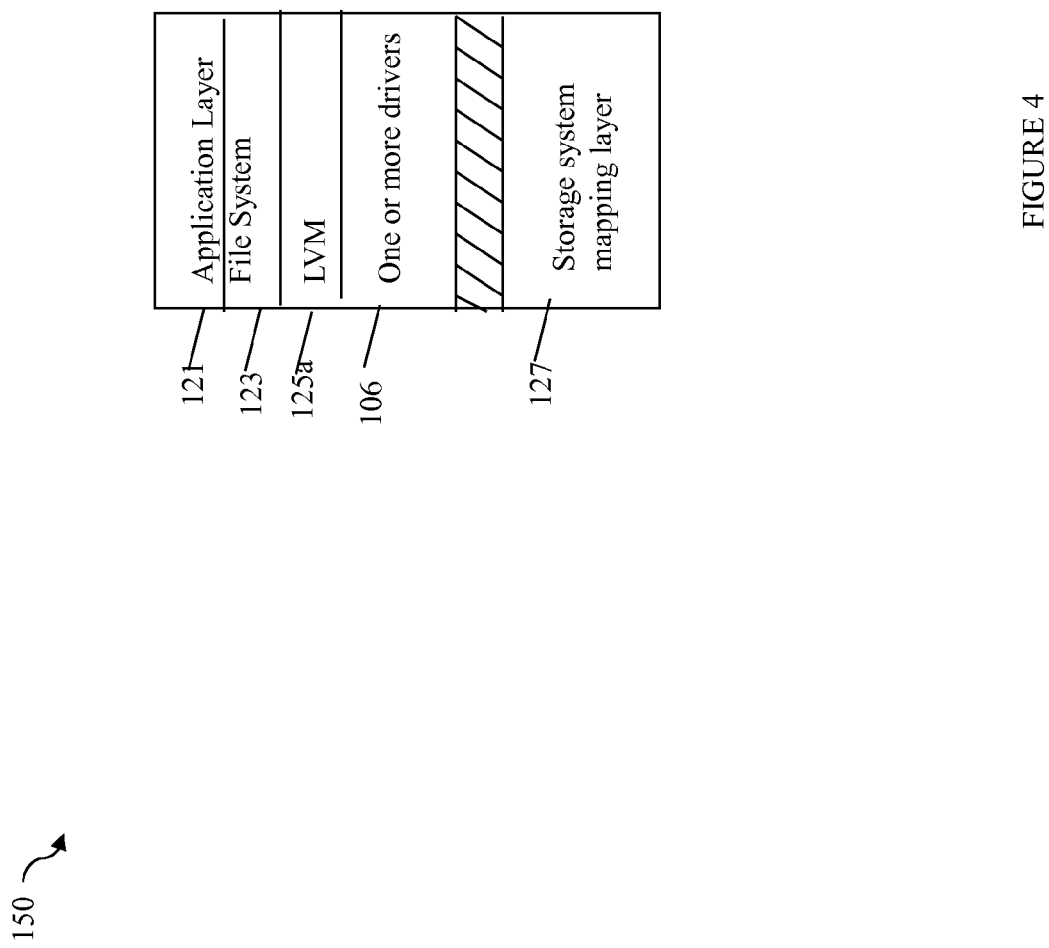
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with performing a data operation request issued by a host to a data storage system such as illustrated in FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be one or more drivers 106 which handle processing of the I/O received from layer 125a. The one or more drivers represented by 106 may include, for example, a SCSI driver (e.g., performs processing for sending requests and receiving responses in accordance with the SCSI standard), a hardware driver (e.g., a driver for an HBA of the host which sends commands or requests to the data storage system and also receives responses and other communications from the data storage system), and the like. Generally, one or more layers between the application layer 121 and the one or more drivers 106 may provide for mapping a LUN (such as used in connection with block-based storage) presented by the data storage system to the host to another logical data storage entity, such as a file, that may be used by the application layer 123.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the drivers 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g. a cache hit). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read hit whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In existing systems, processing may be performed as just described—to unconditionally cache reads as a result of a cache miss and to execute a dependent sequence of steps whereby the DA writes read miss data (retrieved from physical storage) to cache and the HA then retrieves the requested data from the cache to return to the requesting host.

Described in following paragraphs are techniques may be used in connection with read miss processing or servicing read misses on the data storage system. In accordance with such techniques, read miss data retrieved by the DA from physical storage may be directly provided to the HA without having to pass through cache or utilize cache to communicate the data from the DA to the HA. Additionally, caching of the read miss data in a data storage system global memory cache may or may not be performed. Furthermore, if such caching of read miss data is performed, it may be performed asynchronously as a background task by the DA. A determination of whether to perform such asynchronous caching may be made in accordance with one or more criteria. Such criteria may include a level of busyness of the DA, as well as possibly other criteria as described in more detail in following paragraphs. In at least one embodiment, if the DA is determined to have a level of busyness that is too high or exceeds a particular level, cacheless read processing may be performed. Otherwise, the DA may perform deferred caching processing.

As described herein, with cacheless read processing, there is no caching of read miss data. With cacheless read processing for read misses, the DA reads requested read data from physical storage and does not store the data in cache. Rather, the data is transmitted directly from the DA to the HA without having the HA obtain the requested data from cache. Furthermore, the DA does not write the data to cache asynchronously. In this manner, writing read miss data to cache may be avoided when the DA is very busy as an optimization. With deferred caching processing as with cacheless read processing, the DA reads the requested read data from physical storage and transmits the data directly from the DA to the HA without having the HA obtain the requested data from cache. Additionally, with deferred caching processing, the DA asynchronously copies the read data to cache.

As will be described in following paragraphs, determining whether to perform cacheless read processing (which may also be referred to as optimized read miss processing) or deferred caching processing for read misses may or may not result in entirely all read misses being processed using exclusively either cacheless read processing or deferred caching processing. As described below in more detail, some embodiment may provide for a percentage of read misses being processed using cacheless read processing with a remaining percentage being processed using deferred caching processing. The foregoing percentage may also be dynamically determined and varied in an embodiment as will also be described in following paragraphs.

An embodiment may use any suitable metric for specifying a level or measurement of busyness of each DA. In one embodiment, an indicator of DA busyness based on DA utilization may be used to specify the level of busyness of a DA. The DA may be a component including a processor and DA utilization may be measured with respect to an amount of time the processor (e.g., CPU of the DA component) is not idle (e.g. is executing code or instructions and performing processing). In one embodiment, the DA level of busyness may be represented by a busyness indicator that is an integer value in the inclusive range of 0 through 10, which 10 being the highest and 0 being the lowest. In one embodiment, the utilization expressed in terms of a percentage may be mapped to a corresponding integer value in the foregoing inclusive range (e.g., indicator 0 may represent a range of utilization from 0-5%; indicator 1 may represent a utilization range from greater than 5% to 15%; indicator 2 may represent a utilization range from greater than 15% to 25%; and so on). Other mappings between utilization percentages and indicators may be used in an embodiment. Another metric besides CPU utilization that may be used to determine a level of busyness of the DA may be, for example, an average number of I/Os or read data requests processed by the DA for a given unit of time (e.g., #IOPS or I/Os per second). In accordance with techniques herein, such a level of busyness may be determined for each DA in the data storage system.

As described in following paragraphs, different thresholds or levels of busyness may be specified for use with techniques herein. For example, a maximum level of DA busyness based on utilization as just described may be 70% or 7. An embodiment may determine a weighted average representing the average level of busyness for the DA. An embodiment may determine a weighted average that weights more heavily the more recent levels of busyness determined for the DA. Such a weighted average may be used in combination with other criteria for determining whether to service a read miss using cacheless read processing or deferred caching processing. Such criteria may be used, for example, in determining a percentage of read misses serviced using cacheless read processing or deferred caching processing. The foregoing percentage may indicate a percentage of read misses for which cacheless read processing is performed rather than deferred caching processing. The percentage may be dynamic or varied in accordance with such criteria as described herein. More generally, whether a DA performs cacheless read processing or deferred caching processing for a read miss may be determined in accordance with one or more criteria including a level of busyness determined for the DA.

Figure 5:
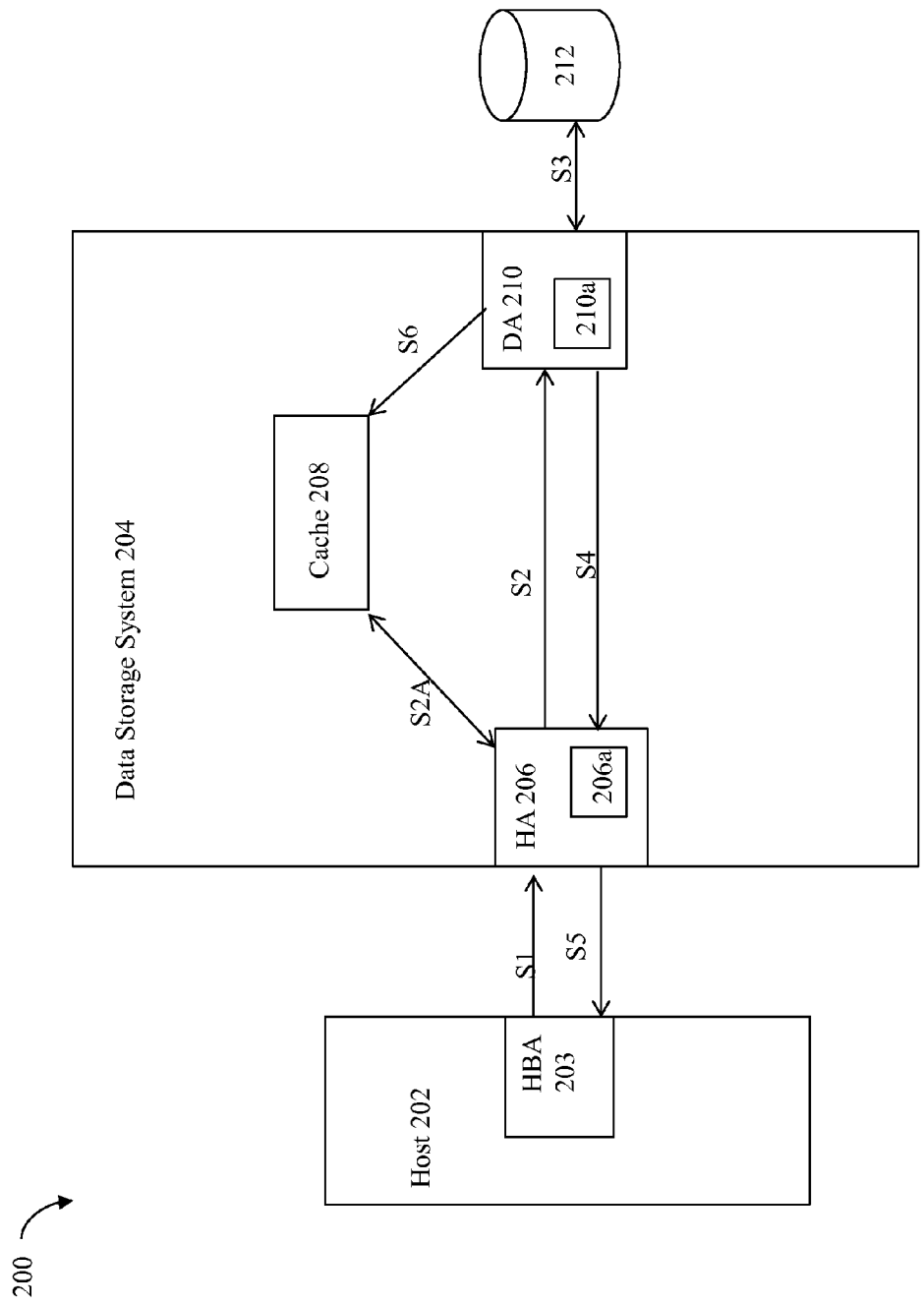
FIG. 5 is an example illustrating processing flow between components of a system in an embodiment in accordance with techniques herein.

Referring to FIG. 5, shown is an example of a system illustrating use techniques of techniques herein. The example 200 includes host 202 and data storage system 204. The host 202 includes HBA 203. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in FIG. 2A, the cache 208 may be a portion of global memory of the data storage system 204. The HA 206 includes a local memory or buffer 206a used exclusively by the HA 206. For example, if the HA 206 is included on a chip or board of the system 204, element 206a may represent a form of memory included locally on the chip or board accessible only to the HA 206. In a similar manner, the DA 210 may include a local memory or buffer 210a.

As a first step S1, the host 202 sends an I/O request, such as a read request, to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S2A and returns the requested read data to the host 202 in step S5. Alternatively, if the read request is a read miss, processing may be performed using techniques herein. The HA 206 may request S2 that a back-end component, such as the DA 210, retrieve the requested data from physical storage device 212. It should be noted that in performing S2, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S3. The DA 210 may store the read data in a local memory 210a. The requested read data may then be transmitted from 210a of the DA 210 in step S4 to the HA 206. The read data received by the HA 206 in S4 may be stored in local memory 206a of the HA 206. The HA 206 may then return the requested read data to the host 202 in step S5.

Additionally, in accordance with techniques herein, the DA 210 may perform processing to determine whether to store S6 the requested read data from 210a in the cache 208. It should be noted that step S6 may be generally commenced any time after the data is placed in the local memory buffer 210a. Additionally, the copying of the data from 210a to 208, if performed, may be performed as a background task and in an asynchronous manner. In this way, the sequencing of steps to return the requested read data to the host for a read miss is not dependent on having the requested read data stored in cache 208 prior to returning the requested read data to the host 202. In other words, there is no requirement to complete step S6 prior to returning the requested read data to the host 202. As described elsewhere herein in more detail, the DA 210 may determine whether to perform step S6 in accordance with one or more criteria. The criteria may include a metric indicating a level of busyness of the DA 210. Thus, the decision of whether to perform cacheless read processing on the data storage system for servicing a read miss operation (e.g., as just described in which steps S2, S3, and S4 are performed and in which step S6 is omitted), or whether to perform deferred caching processing for servicing a read miss operation (e.g., as just described in which steps S2, S3, S4 and S6 are performed) may be determined in accordance with one or more criteria including a level of busyness determined for the DA 210. As described in more detail below, the criteria may also include performing the cacheless read processing rather than the deferred caching processing for servicing a read miss operation a percentage of the time (e.g., for a percentage of read misses over a time period). The percentage may vary in accordance with the level of busyness of the DA as determined at different points in time. As the percentage changes over time, processing may be performed to accordingly increase or decrease the number of read misses processed using either cacheless read processing or deferred caching processing.

As described above, a read miss may be serviced by performing either cacheless read processing or deferred caching processing. With cacheless read processing, the requested read data is read by the DA from the physical storage device and then transmitted directly from the DA to the FA, without putting data into cache at any time. With cacheless read processing there is no asynchronous caching of the read miss data as with the deferred caching processing noted herein. Cacheless read processing results in reduced I/O response time and increase the overall system IOPS (e.g., rate of processing I/Os per second). With deferred caching processing, the requested read data is read by the DA from the physical storage device and then transmitted directly from the DA to the FA, after which the read data is also stored in cache (e.g. asynchronously) for use in servicing subsequent potential read requests for the same read data (whereby such subsequent read requests would result in a read hit since the requested read data is now in cache).

With reference back to FIG. 5, an embodiment may perform any suitable optimization in accordance with the particulars of the embodiment. For example, in one embodiment, DAs and HAs (as well as other components of the system described herein) may or may not be located on the same physical board. If the DA 210 and HA 206 are physically located on the same component board in the data storage system, an optimization may be performed in the case of a cacheless read whereby the read miss data retrieved from the physical device 212 may be written directly by the DA into the HA's buffer 206a without allocation and use of the DA's local buffer 210a. In this case, steps S3 and S4 may be viewed as a single step since the retrieved data is not stored in 210a. If deferred caching processing is performed, or if the cacheless read processing is otherwise performed with respect to a DA and HA which are not located on the same physical board, processing may be performed as described and represented above in connection with FIG. 5 whereby the read miss data retrieved from device 212 is first stored in the DA's local buffer 210a and then copied to the HA's local buffer 206a. Additionally, if deferred caching processing is performed, the data is copied asynchronously from 210a to the cache 208.

As mentioned above, one embodiment may perform cacheless read processing rather than deferred caching processing when servicing a read miss operation a percentage of the time referred to as $P_{off}$, thereby denoting a percentage of the time that the deferred caching is off or not performed. Stated another way, $P_{off}$ represents the percentage of read miss I/Os that are serviced using cacheless read processing. As will be described in following paragraphs, the percentage of read miss I/Os that are serviced by a DA using cacheless read processing rather than deferred caching processing may be adjusted and may vary, for example, in accordance with a level of busyness of the DA. As will also be described below, the percentage may be adjusted, for example, by a fixed amount at the end of each evaluation period if necessary, and the new percentage may become effective for the duration of the next evaluation period. When the percentage value for $P_{off}$ is 0%, deferred caching processing is always on or performed for servicing all read misses (e.g., $P_{off}$=0% means that cacheless read processing is not performed for servicing any read misses). When $P_{off}$ is 100%, deferred caching processing is always off or not performed for servicing any read misses. In other words, $P_{off}$=100% means that cacheless read processing is performed to service all read misses.

For each DA, a DA busy level may be determined at each occurrence of a DA busy level sampling time period, such as ½ second intervals. At each DA busy level sample time period, "i", such as every ½ second, an indicator of overall DA busyness, Bi, may be determined. As described herein, DA CPU utilization may be used in an embodiment to determine a measure of DA busyness. In one embodiment, the DA busy level indicator may have be an integer value in the inclusive range from 0 to 10, with 10 denoting the busiest level ranging to 0 denoting the least or lowest level of busyness. Thus, the higher an indicator value, the higher the level of busyness of the DA. An embodiment may specify the following thresholds for use with techniques herein:

$B_{max}$ denoting a maximum or upper bound of a level of DA busyness;

$B_{min}$ denoting a minimum or lower bound of a level of DA busyness; and $B_{target}$ denoting a target or preferred level of DA busyness. An embodiment may specify any suitable values for the foregoing three thresholds. For example, in one embodiment using DA utilization percentage as the metric for determining a DA busy level, $B_{max}$ may be 70% or 7 (expressed in terms if an integer indicator value between 0 and 10 as noted above), $B_{min}$ may be 30% or 3 (expressed in terms of an integer indicator value between 0 and 10 as noted above) and $B_{target}$ may be determined as the midpoint of $B_{max}$ and $B_{min}$ (e.g., 50% or 5).

An evaluation period may be defined which may include a fixed number of DA busy level sampling periods. For example, in one embodiment the number of DA busy level periods in a single evaluation period may be 10. During each evaluation period, a DA busy level measurement is obtained at each DA busy level sampling period occurring within the current evaluation period. At the end of each evaluation period, processing may be performed to determine an average DA busy level, $B_{avg}$, and a DA busy level trend $T_b$. The average DA busy level, $B_{avg}$, may be calculated as follows:

$$B_{avg}=(B_0+B_1+B_2+B_3\ldots+B_N)/N+1 \quad \text{EQUATION 1}$$

wherein

N+1 represents the number of DA busy level sampling periods in an evaluation period (as noted above) whereby the sampling periods range from 0 to N, inclusively; and each $B_i$, ranging from 0 to N inclusively, represents a DA busy level determined for the $i^{th}$ DA busy level sampling period in the evaluation period.

The DA busy level trend, $T_b$, may be calculated as follows:

$$T_b=(B_1-B_0)*1+(B_2-B_1)*2+(B_3-B_2)*3+\ldots+(B_n-B_{n-1})*N \quad \text{EQUATION 2}$$

wherein N and $B_i$, are as described above.

For a value of i, $B_i$ represents a DA busy level determined for the $i^{th}$ DA busy level sampling period in the evaluation period. It should be noted that $B_N$ is the most recent DA busy level sample in the evaluation period and $B_0$ is the first and oldest DA busy level in the current evaluation period. In this manner, the DA busy level sampling periods from 0 to N occur in a time ordered sequence as denoted by increasing "i" value ranging from 0 to N. EQUATION 2 provides a weighted trending value with greater weight towards the most recently determined DA busy level values.

An alternative way of expressing $T_b$ as in EQUATION 2 is as follows:

$$Tb=\Sigma_{i=1}^{N}(B_i-B_{i-1})*i \quad \text{EQUATION 3}$$

If $T_b$ is a positive value (e.g., greater than 0), $T_b$ indicates a trend that the DA is becoming busier. If $T_b$ is a negative value (e.g., less than 0), $T_b$ indicates a trend that the DA is becoming idler or is experiencing a trend of a decrease in the level of busyness.

In one embodiment, each DA may be characterized as being in one of two states—an adjusting state or a non-adjusting state. An assessment may be made at the end of each evaluation period to assess the current state of the DA as one of the foregoing two states. The DA may be initially in the non-adjusting state and may transition from the non-adjusting to the adjusting state when, for the DA, $B_{avg}>=B_{max}$ at the end of the evaluation period. The DA transition from the adjusting state to the non-adjusting state when $P_{off}$ reaches 0 thereby denoting that deferred caching processing is performed for servicing all read misses. When in the adjusting state at the end of an evaluation period, processing may be performed to determine whether any adjustment to the current percentage value specified for $P_{off}$ is necessary, and if so, accordingly adjust the current percentage value specified for $P_{off}$. In one embodiment, a fixed increment or percentage amount, "S" may be specified denoting the amount by which Poff may be incremented or decremented in a single evaluation period. For example, in one embodiment, S may be 10% thereby denoting the amount by which $P_{off}$ is increased or decreased, if necessary at the end of an evaluation period.

Processing performed in the adjustment state to determine when to increase or decrease $P_{off}$ for an evaluation period, and if such an adjustment is needed, determine the adjusted value for $P_{off}$ may be expressed as follows:

IF $(B_{avg}>=B_{max})$ or $(B_{avg}>B_{target}$ and $T_b>0)$ THEN
  increase $P_{off}$ by S
ELSE
IF $(B_{avg}<=B_{min})$ or $(B_{avg}<B_{target}$ and $T_b<0)$ THEN
  decrease $P_{off}$ by S.

It should be noted that an embodiment may use other values rather than a single fixed value for both incrementing and decrementing $P_{off}$. For example, an embodiment may use a different value for incrementing and a different value for decrementing. Additionally, an embodiment may use a value other than a fixed value. For example, an embodiment may vary the amount of increment or decrement for a given evaluation period in accordance with one or more factors such as the value of $B_{avg}$, the number of most recent successive evaluation periods the DA has been in the adjusting state and already upwardly or downwardly adjusted $P_{off}$, and the like.

Figure 6:
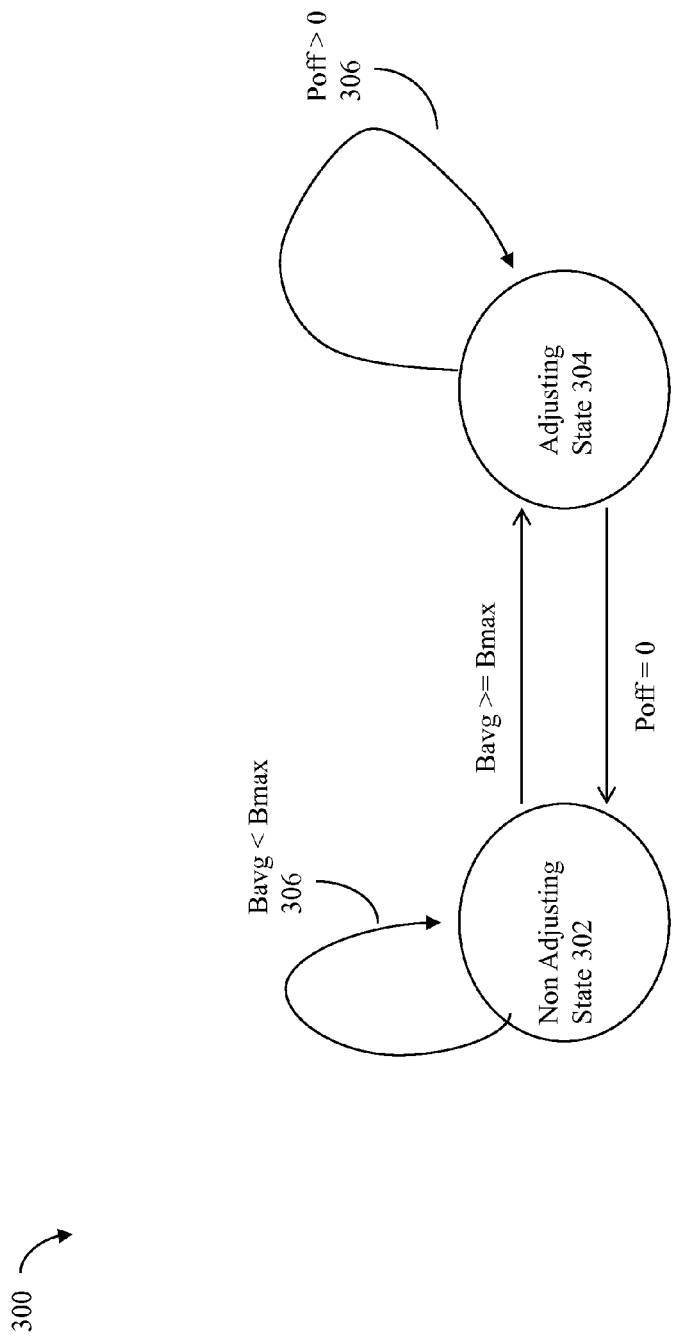
FIG. 6 is a state transition diagram illustrating states of a back-end component (e.g., disk adapter or DA) in an embodiment in accordance with techniques herein.

Referring to FIG. 6, shown is an example of a state transition diagram that may represent the foregoing two states for a DA in an embodiment in accordance with techniques herein. The example 300 includes a non-adjusting state 302 and an adjusting state 304. Consistent with the above-mentioned description, a DA may be initially in state 302 and may remain in the non-adjusting state 302 while the DA's value of $B_{avg}$ (as determined for an evaluation period) remains less than $B_{max}$. The DA may transition from state 302 to the adjusting state 304 when the DA's value of $B_{avg}$ equals or exceeds $B_{Max}$. Once in the adjusting state 304, processing may be performed to determine whether to adjust the current value of $P_{off}$ and if needed, perform a suitable adjustment (e.g., increase or decrease) to the current value of $P_{off}$. The DA may remain in the adjusting state 304 as long as $P_{off}$ for the DA is greater than zero (0). The DA transitions from the adjusting state 304 to the non-adjusting state 302 when $P_{off}$ for the DA is equal to zero (0).

What will now be described are flowcharts that summarize processing described above as may be performed in an embodiment in accordance with techniques herein.

Figure 7A:
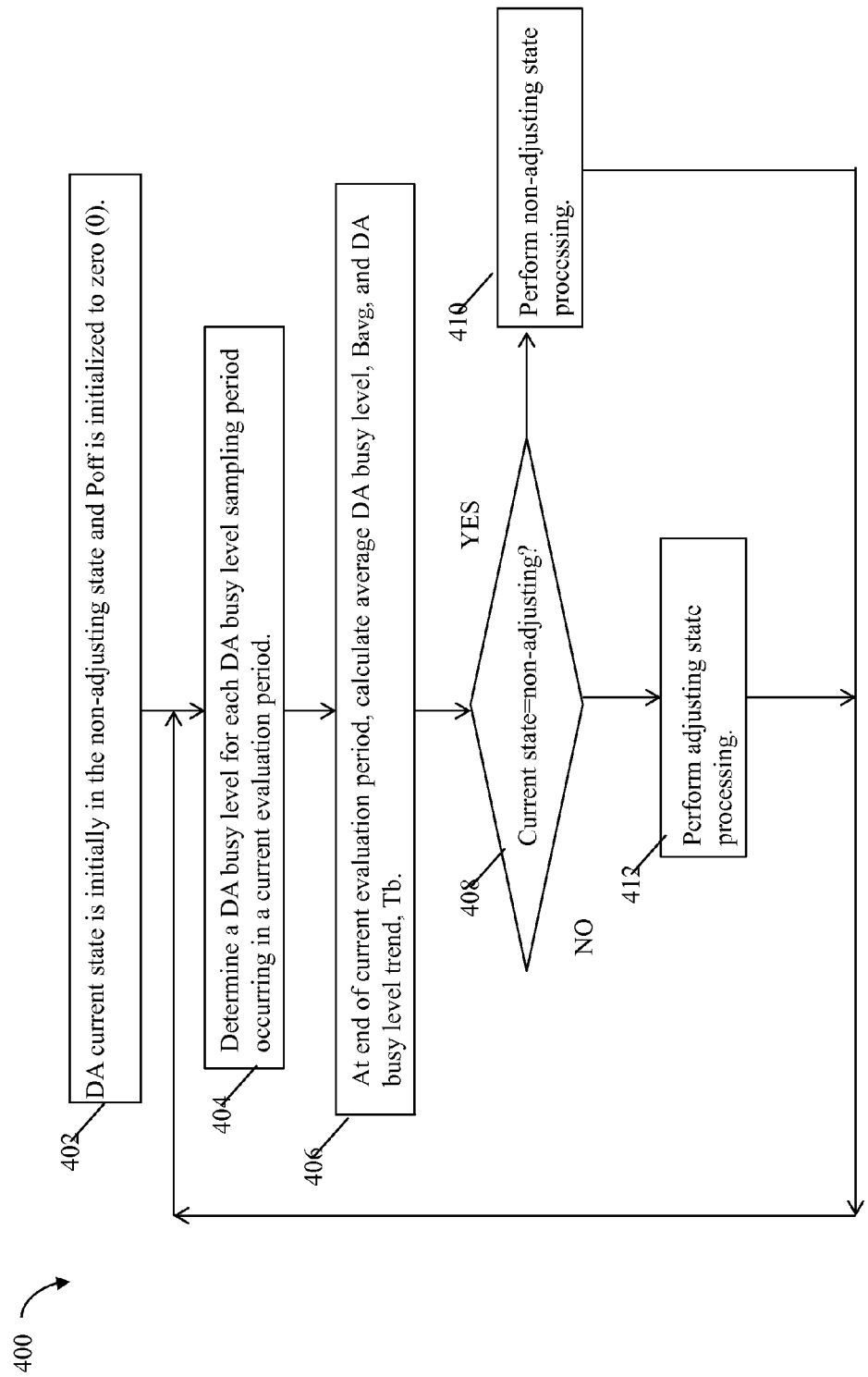
FIGS. 7A, 7B, 7C and 8 are flowcharts of processing steps that may be performed in an embodiment in accordance with techniques herein.

Referring to FIG. 7A, shown is a flowchart 400 summarizing processing that may be performed in an embodiment in accordance with techniques herein for a single DA. The steps of 400 may be performed for each DA. In step 402, the DA is current state is initially in the non-adjusting state and has its $P_{off}$ value initialized to zero (0). The steps beginning at 404 may be performed with respect to each evaluation period. At step 404, a DA busy level may be determined for each DA busy level sampling period occurring in a current evaluation period. At step 406, at the end of the current evaluation period, the average DA busy level, $B_{avg}$, and DA busy level trend, $T_b$, are calculated. At step 408, a determination is made as to whether the current state of the DA as is non-adjusting. If step 408 evaluates to yes, control proceeds to step 410 to perform non-adjusting state processing. Non-adjusting state processing is described in more detail in connection with FIG. 7B. After performing step 411, control proceeds to step 404 to perform processing associated with the next evaluation period. If step 408 evaluates to no, control proceeds to step 412 to perform adjusting state processing. Adjusting state processing is described in more detail in connection with FIG. 7C. After performing step 412, control proceeds to step 404.

Figure 7B:
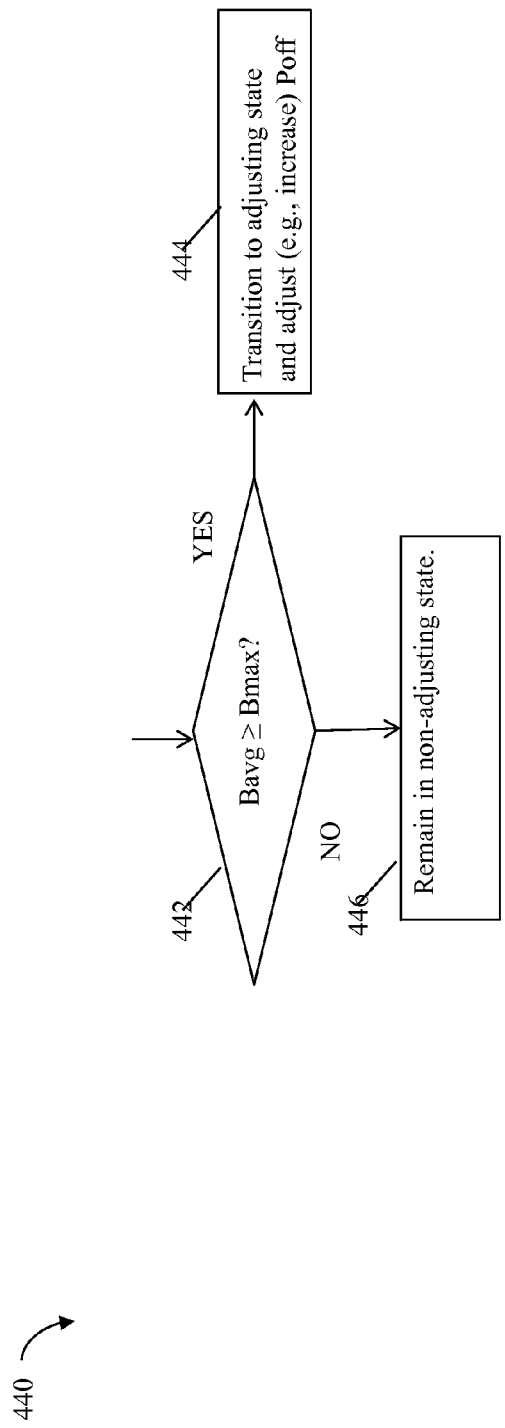

Referring to FIG. 7B, shown is a flowchart 440 of processing steps that may be performed in an embodiment in accordance with techniques herein for non-adjustment state processing. The flowchart 440 provides additional detail of step 410 of FIG. 7A that may be performed in an embodiment in accordance with techniques herein. At step 442, a determination is made as to whether $B_{avg}$ is greater than or equal to $B_{max}$. If step 442 evaluates to yes, control proceeds to step 444. In step 444, the DA transitions from the non-adjusting to the adjusting state and processing is performed to adjust (e.g., increase) the value of $P_{off}$. If step 442 evaluates to no, control proceeds to step 446 where the DA remains in the current non-adjusting state.

Figure 7C:
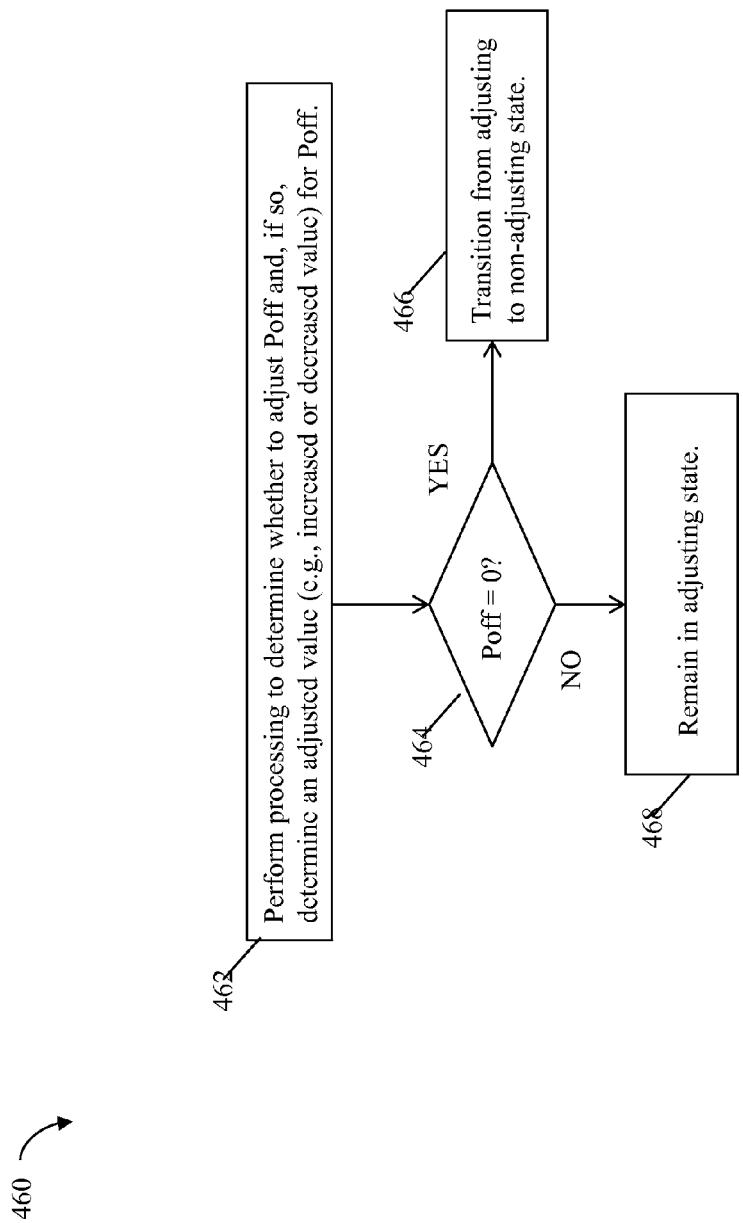

Referring to FIG. 7C, shown is a flowchart 460 of processing steps that may be performed in an embodiment in accordance with techniques herein for adjustment state processing. The flowchart 460 provides additional detail of step 412 of FIG. 7A that may be performed in an embodiment in accordance with techniques herein. At step 462, processing is performed to determine whether to adjust $P_{off}$, and if so, determine a suitable adjusted value (e.g., increased or decreased value) for $P_{off}$. As described elsewhere herein, such a determination and possible adjustment to $P_{off}$ may be performed using $B_{avg}$ and $T_b$ as just determined for the current evaluation period in step 406, along with $B_{min}$, $B_{max}$ and $B_{target}$. At step 464, a determination is made as to whether Poff is 0. If step 464 evaluates to yes, control proceeds to step 466 to transition the DA from the adjusting to the non-adjusting state. If step 464 evaluates to no, control proceeds to step 468 where the DA remains in the adjusting state.

Figure 8:
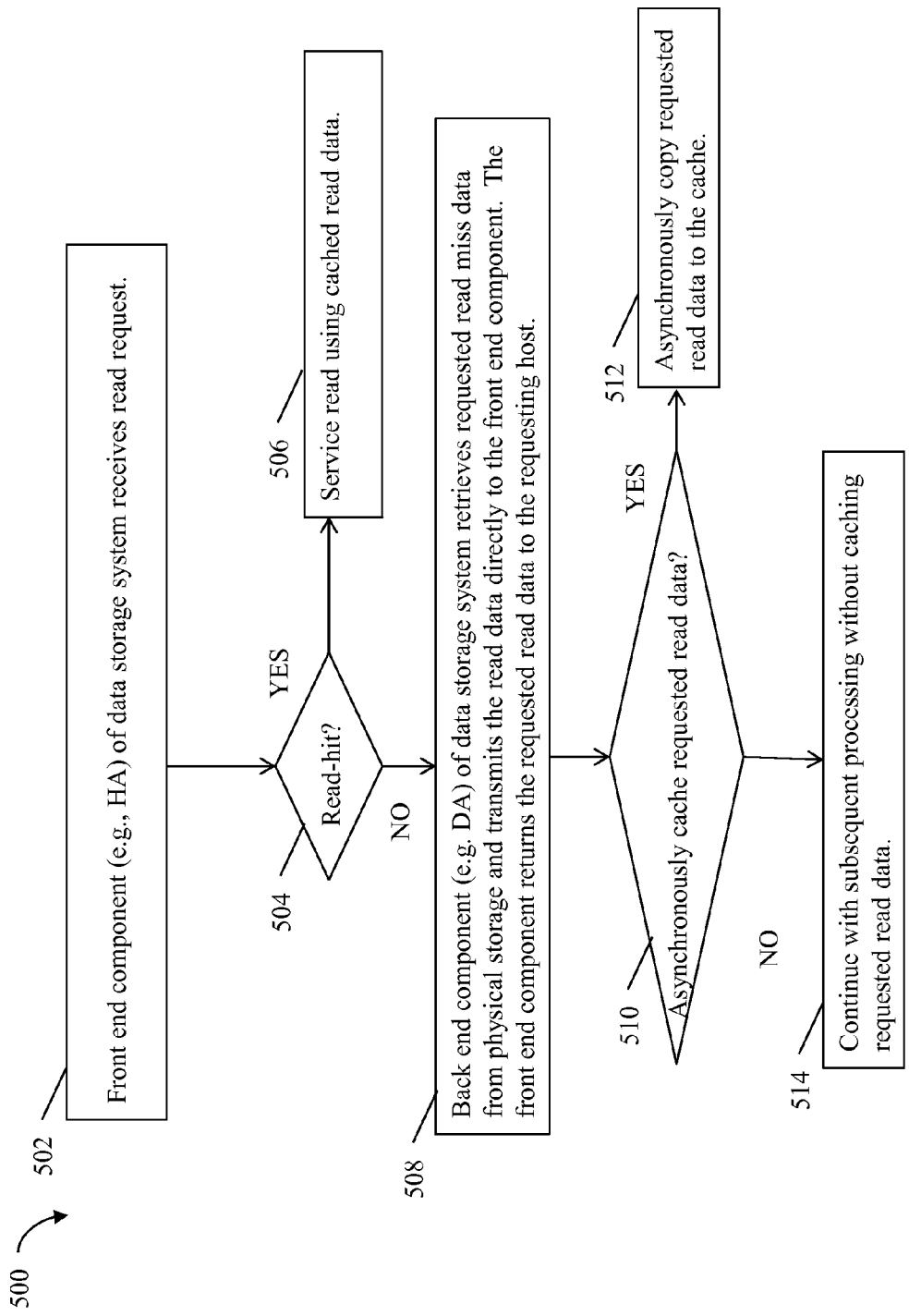

Referring to FIG. 8, shown is a flowchart 500 of processing that may be performed in an embodiment in accordance with techniques herein for a received read I/O request. At step 502, a front end component, such as an HA, of the data storage system received a read request. At step 504, a determination is made as to whether the received read request is a read hit whereby all the requested read data is stored in cache so that the read request may be serviced using the cached data. If it is determined in step 504 that the request is a read hit, control proceeds to step 506 to service the read using the cached read data. In step 506, the requested read data is retrieved from cache by the front end component and returned to the requesting host. If step 504 determines that the read request is not a read hit and is therefore rather a read miss (whereby all the requested read data is not in cache), control proceeds to step 508. In step 508, a back end component (e.g. DA) of the data storage system receives and responds to a request from the front end component to retrieve the requested read miss data. The back end component retrieves the requested read miss data from physical storage and transmits the retrieved read data directly to the front end component. The front end component returns the requested read data to the requesting host.

At step 510, a determination is made as to whether to additionally and optionally perform processing to asynchronously cache the requested read data. A determination at step 510 may be made using the current value for $P_{off}$ for the DA. Using Poff, processing may be performed so that an approximate percentage of all read misses as tracked over a time period may be processed using the cacheless read (without asynchronous caching in step 512) whereby such percentage is represented by the current value of Poff for the DA. If step 510 evaluates to yes, control proceeds to step 512 where processing is performed to asynchronously copy the requested read data from the DA to the cache. If step 510 evaluates to no, control proceeds to step 514 to continue with subsequent processing without caching the requested read data (e.g., performing step 514 means that cacheless read processing is performed to service the read miss, and performing step 512 means that deferred caching processing is performed to service the read miss). As described elsewhere herein, it should be noted that although steps 510, 512 and 514 are illustrated as being performed in sequence after steps 508 and 510 which include returning requested read data to the host, an embodiment may commence performing steps 510, 512 and 514 any time after the requested read data is read from physical storage by the DA. As described elsewhere herein, the copying performed in step 512 may be performed as a background task.

As described above, an embodiment may generally use one or more criteria in connection with determining whether to service a read miss using cacheless read processing or deterred caching processing. Examples of such criteria are described herein. Thus, the criteria used to determine whether a DA services a read miss using cacheless read processing or deferred caching processing may generally include any one or more of: a level of busyness of the DA, a current value of $P_{off}$ for the DA, $B_{min}$, $B_{max}$, $B_{target}$, $B_{avg}$, $T_b$, the amount of increment or decrement (e.g., S) adjustment to $P_{off}$ and the current DA state (e.g., as one of adjusting or non-adjusting). An embodiment may use any such criteria as described herein alone or in combination with any other suitable criteria that may be utilized an embodiment.

The foregoing describes techniques for cacheless read and deferred caching processing for use with servicing read misses in order to optimize data storage system response time and resource utilization. As described herein such as using asynchronous caching, data may be placed in the data storage system cache in the hope that future reads/writes for the same cached data will be serviced using the cached data rather than require retrieval of data from physical storage. Under normal DA utilization levels such as associated with the non-adjusting state, techniques herein provide for reducing the latency of read miss requests sent by the host while still getting the benefit that future possible reads to neighboring data (going to the same track) will enjoy the latency of a read hit. Consistent with description herein, under normal DA utilization busyness levels, for read misses, the DA reads the data into its local buffer and sends the data directly to the front end (e.g., HA) component. This is in contrast to other existing systems which may have the DA store the read data in cache, and then have the HA retrieve the read data from the cache which is then returned to the host. In this manner using techniques herein, the HA may return the requested data to the host whereby caching is skipped since the DA directly provides the requested data to the HA without going indirectly through cache. When operating in accordance with deferred caching processing for a read miss, in the background, the DA may asynchronously copy the retrieved read data to the cache. It should be noted that the DA may retrieve data from the physical storage and may store data in the cache in data portions of a first size, such as a track which may be 64K. Thus, even if less than the entire track of data is requested in connection with the read, the entire track including the requested data may be retrieved from physical storage and also stored asynchronously in cache. In this manner, a full track of data of the first size may be copied to cache so that IOs with similar locality of reference will benefit from read hit latency.

It should be noted that the host may also optionally perform host-side caching of data. For example, a host may use EMC® VFCache™ or EMCC® XtremSW Cache™ by EMC Corporation. In such cases with host-side caching, a read request from an application on the host may also possibly be serviced using data cached on the host side whereby the host may not even need to issue a request to the data storage system for the data. In such embodiments as will be appreciated by those skilled in the art, suitable techniques may be performed to synchronize the host-side cached data with data of the data storage system. In such embodiments using techniques herein with host-side caching, a benefit may be obtained using techniques herein. For example, the host cache read page size may be smaller (e.g., 8K) than the first size (e.g., 64K) of cached data portions of the data storage system. A first 8K data portion may be cached in the host-based cache and the same first 8K portion may also be cached by deferred caching processing as a result of a first read miss. Additionally, the deferred caching processing as performed on the data storage system for the first read miss results in copying an entire 64K data portion which includes the foregoing 8K data portion and additional data logically located in the 64K data portion. In this manner, subsequent reads for data located anywhere in the 64K portion result in a cache hit on the data storage system although only subsequent reads for the same first 8K portion result in a cache hit with respect to the host-side cache.

In the case that the data storage system DA has a level of busyness that is too high exceeding a specified level of busyness, in order to improve the overall system performance, the DA may perform cacheless read processing (which, in some embodiments, may be performed for some percentage of read misses where the percentage may vary from 0% to 100% of read misses depending on the level of DA busyness). When performing cacheless read processing and skipping the asynchronous caching, the CPU demand on the FA and DA may be reduced thereby allowing the system to recover and improve its performance.

It should be noted that an embodiment of a data storage system may have an option that may be configured or set whereby, when the option has a first setting, the data storage system may utilize techniques herein, and when the option has a second setting, the data storage system may disable use of techniques herein. When the option has the second setting, the data storage system may service all read misses as in existing systems without techniques herein whereby the DA retrieves the requested data from physical storage, the DA stores the requested data in the data storage system cache, and then HA (front end component) retrieves the data from the cache and then returns the data to the requesting host. With the second setting, the data storage system may require the foregoing sequence of steps. In contrast, when the option has the first setting, techniques as described herein may be used where read misses may be serviced using cacheless read processing or deferred caching processing as determined in accordance with one or more criteria including a level of DA busyness, percentage of read misses, and the like. In some embodiments, the option may have a third possible setting which may provide for processing all read misses using the cacheless read processing as described herein (whereby the deferred caching processing is off). In some embodiment, the option may have yet a fourth possible setting which may provide for processing all read misses using the deferred caching processing as described herein (whereby the cacheless read processing is off).

An embodiment may determine a current value for the foregoing option in any suitable manner. For example an embodiment may select and dynamically vary the third setting or fourth setting at different points in time in accordance with one or more criteria, such as depending on the level of DA busyness as described herein. In such a rather simplified embodiment using techniques herein, the option setting may indicate to either process all read misses using cacheless read processing or otherwise process all read misses using deferred caching processing.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data operations comprising:
   receiving, from a requester, a read request for first data at a data storage system;
   determining whether the read request results in a cache hit whereby the first data is stored in a cache of the data storage system, or whether the read request otherwise results in a cache miss; and
   if the read request results in a cache miss, determining whether to perform cacheless read processing or deferred caching processing to service the read request, wherein said determining whether to perform cacheless read processing or deferred caching processing is performed in accordance with criteria specifying that a percentage of read requests resulting in a cache miss are processed using the cacheless read processing and that a remaining percentage of read requests resulting in a cache miss are processed using the deferred caching processing, said percentage varying in accordance with a measurement indicating a level of busyness of a back-end component used to retrieve from physical storage any portion of the first data not currently stored in the cache.

2. The method of claim 1, wherein the cacheless read processing further includes:
   retrieving, using the back-end component that stores and retrieves data from physical storage devices, any portion of the first data not currently stored in the cache from one or more physical storage devices;
   returning the any portion of the first data directly from the back-end component to a front-end component without caching the first data; and
   returning the first data from the front-end component to the requester.

3. The method of claim 2, wherein the deferred caching processing further includes:
   retrieving, using the back-end component, any portion of the first data not currently stored in the cache from one or more physical storage devices;
   returning the any portion of the first data directly from the back-end component to a front-end component; and
   asynchronously copying the any portion of the first data retrieved from the one or more physical storage devices by the back-end component to the cache.

4. The method of claim 3, wherein the back-end component retrieves the any portion of the first data not currently stored in the cache from the one or more physical storage devices and stores the any portion to a first local buffer of the back-end component and transmits the any portion of the first data from the first local buffer of the back-end component to a second local buffer of the front-end component.

5. The method of claim 4, wherein asynchronously copying any portion of the first data retrieved from the one or more physical devices is performed as a background copying operation.

6. The method of claim 5, wherein the measurement identifies a level of utilization of the back-end component.

7. The method of claim 6, wherein the level of busyness of the back-end component is determined at each occurrence of a first time interval.

8. The method of claim 7, wherein an evaluation period spans a second time interval including a plurality of occurrences of the first time interval, and at each occurrence of the second time interval, evaluation processing is performed including:
   determining an average level of busyness of the back-end component; and
   determining a busy level trend for the back-end component.

9. The method of claim 8, wherein the back-end component transitions from a non-adjusting state to an adjusting state when the average level of busyness for the back-end component exceeds, or is equal to, a maximum level and wherein, once the back-end component is in the adjusting state, the back-end component transitions out of the adjusting state to the non-adjusting state when the criteria specifies that the percentage of read requests resulting in a cache miss that are processed using the cacheless read is zero percent whereby all read requests processed by the back-end component resulting in a cache miss are processed using the deferred caching processing.

10. The method of claim 9, wherein, when the back-end component is in the adjusting state at the end of an evaluation period, adjustment processing is performed comprising:
    determining whether the average level of busyness of the back-end component is greater than or equal to the maximum level; and
    if it is determined that the average level of busyness of the back-end component is greater than or equal to the maximum level, increasing a current value denoting the percentage of read requests serviced by the back-end component resulting in a cache miss that are processed using the cacheless read processing.

11. The method of claim 10, wherein the adjustment processing further comprises:
    determining whether the average level of busyness of the back-end component is greater than a target level of busyness and also whether the busy level trend indicates that the back-end component has an increasing level of busyness trend; and
    if it is determined that the average level of busyness of the back-end component is greater than the target level and that the busy level trend indicates that the back-end component has an increasing level of busyness trend, increasing the current value denoting the percentage of read requests serviced by the back-end component resulting in a cache miss that are processed using the cacheless read processing.

12. The method of claim 9, wherein, when the back-end component is in the adjusting state at the end of an evaluation period, adjustment processing is performed comprising:

determining whether the average level of busyness of the back-end component is less than or equal to the minimum level; and if it is determined that the average level of busyness of the back-end component is less than or equal to the minimum level, decreasing a current value denoting the percentage of read requests serviced by the back-end component resulting in a cache miss that are processed using the cacheless read processing.

13. The method of claim 12, wherein the adjustment processing further comprises:

determining whether the average level of busyness of the back-end component is less than a target level and also whether the busy level trend indicates that the back-end component has a decreasing level of busyness trend; and if it is determined that the average level of busyness of the back-end component is less than the target level and that the busy level trend indicates that the back-end component has a decreasing level of busyness trend, decreasing the current value denoting the percentage of read requests serviced by the back-end component resulting in a cache miss that are processed using the cacheless read processing.

14. The method of claim 8, wherein the busy level trend, Tb, for the back-end component is determined as:

$$Tb = \sum_{i=1}^{N}(B_i - B_{i-1})*i$$

wherein each Bi i, ranging from 1 to N inclusively, denotes a level of busyness for the back-end component at an $i^{th}$ occurrence of a first time interval, wherein each $B_{i-1}$ denotes a level of busyness for the back-end component at an $i-1^{th}$ occurrence of a first time interval, wherein wherein there are N+1 most recently determined levels of busyness for N+1 most recent occurrences of the first time interval, and whereby, of the N+1 most recent levels of busyness determined for the back-end component, $B_N$, represents a most recently determined level of busyness for the back-end component and $B_0$ represents a least recently determined level of busyness for the back-end component.

15. The method of claim 13, wherein the target level is specified as a midpoint between the maximum level and a minimum level of busyness for the back-end component.

16. A system comprising:
a plurality of physical storage devices;
a plurality of back-end components used to read data from, and write data to, the physical storage devices, wherein each of the plurality of back-end components performs data access operations with respect to a portion of the physical storage devices;
a plurality of front-end components which receive I/O requests;
a cache;
a non-transitory computer readable medium comprising code stored thereon that, when executed, performs a method comprising:
determining whether a read request for first data results in a cache hit whereby the first data is stored in the cache of the data storage system, or whether the read request otherwise results in a cache miss; and
if the read request results in a cache miss, determining whether to perform cacheless read processing or deferred caching processing to service the read request, wherein determining whether to perform cacheless read processing or deferred caching processing is performed in accordance with criteria specifying that a percentage of read requests resulting in a cache miss are processed using the cacheless read processing and that a remaining percentage of read requests resulting in a cache miss are processed using the deferred caching processing, said percentage varying in accordance with a measurement indicating a level of busyness of a first of the plurality of back-end components used to retrieve from one or more of the physical storage devices any portion of the first data not currently stored in the cache.

17. The system of claim 16, further comprising a plurality of hosts wherein the plurality of hosts send the I/O requests.

18. The system of claim 16, wherein cacheless read processing further includes:
retrieving, using the first back-end component that stores and retrieves data from physical storage devices, any portion of the first data not currently stored in the cache from one or more physical storage devices;
returning the any portion of the first data directly from the first back-end component to one of the plurality of front-end components without caching the first data; and
returning the first data from the one front-end component to the requester; and wherein the deferred caching processing further includes:
retrieving, using the first back-end component, any portion of the first data not currently stored in the cache from one or more physical storage devices;
returning the any portion of the first data directly from the first back-end component to the one front-end component; and
asynchronously copying the any portion of the first data retrieved from the one or more physical storage devices by the first back-end component to the cache.

19. A non-transitory computer readable medium comprising code stored thereon that, when executed, performs a method that processes data operations comprising:
receiving, from a requester, a read request for first data at a data storage system;
determining whether the read request results in a cache hit whereby the first data is stored in a cache of the data storage system, or whether the read request otherwise results in a cache miss; and
if the read request results in a cache miss, determining whether to perform cacheless read processing or deferred caching processing to service the read request, wherein said determining whether to perform cacheless read processing or deferred caching processing is performed in accordance with criteria specifying that a percentage of read requests resulting in a cache miss are processed using the cacheless read processing and that a remaining percentage of read requests resulting in a cache miss are processed using the deferred caching processing, said percentage varying in accordance with a measurement indicating a level of busyness of a back-end component used to retrieve from physical storage any portion of the first data not currently stored in the cache.

* * * * *